C. R. VAN OSDEL.
BERRY BOX.
APPLICATION FILED MAY 1, 1913.
1,101,479.
Patented June 23, 1914.
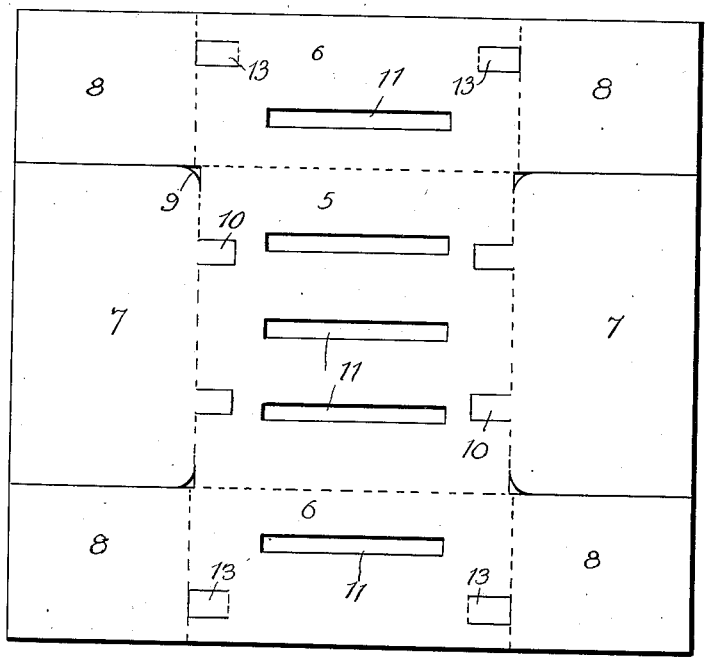
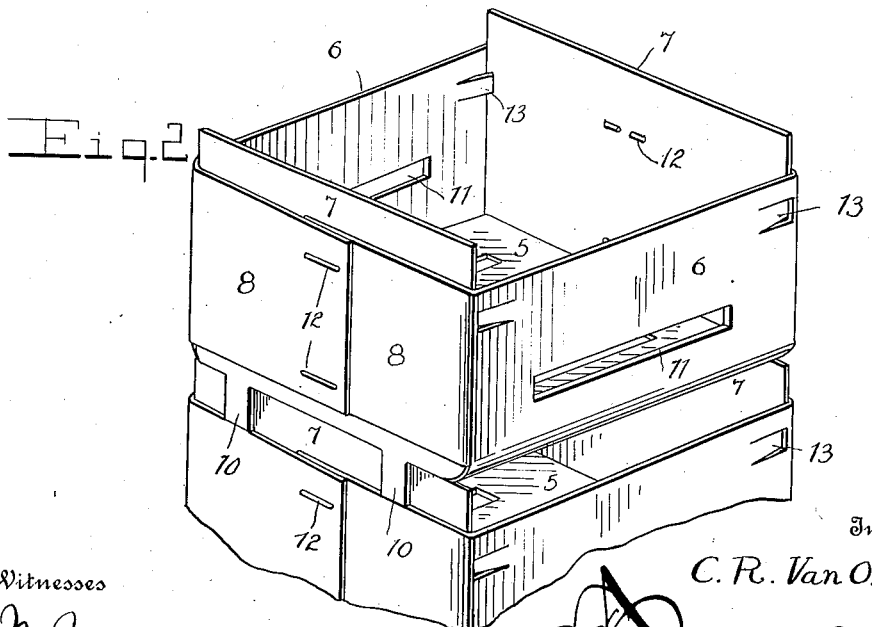
Witnesses
R. N. Jones.
Rodney M. Smith.
Inventor
C. R. Van Osdel.
By
Attorney.

Ferentz
UNITED STATES PATENT OFFICE.

CHARLES R. VAN OSDEL, OF MONROVIA, CALIFORNIA.

BERRY-BOX.

1,101,479.   Specification of Letters Patent.   Patented June 23, 1914.

Application filed May 1, 1913. Serial No. 764,908.

*To all whom it may concern:*

Be it known that I, CHARLES R. VAN OSDEL, a citizen of the United States, residing at Monrovia, in the county of Los Angeles and State of California, have invented certain new and useful Improvements in Berry-Boxes; and I do hereby declare the following to be a full, clear, and exact description of the invention, such as will enable others skilled in the art to which it appertains to make and use the same.

This invention comprehends improvements in berry boxes and has for its principal object the provision of a box of this type, which shall be of extremely strong and simple construction, cheap to manufacture, and a general improvement over those now in use.

Another and more specific object of the invention is to provide berry boxes, each of which is formed of a single piece of suitable material and so constructed as to be capable of being stacked without danger of crushing the berries contained therein.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a view of the blank from which my improved box is formed, and, Fig. 2 is a perspective view, showing one box supported upon another of the same construction.

In the following description and accompanying drawings, similar parts will be referred to and designated by like characters of reference.

My improved box is preferably formed of a single sheet of suitable material, and comprises a bottom 5, sides 6, ends 7, and end flaps 8. As shown in Fig. 1, the blank from which the box is formed is rectangular in shape and creased lightly along the dotted lines so as to permit the sides and ends being extended at an angle to the bottom and the end flaps being folded against the ends 7. It will be noted that the sides 6 are slightly longer than the bottom 5 so that when the box is set up, the end flaps 8 will lie parallel with the ends 7. The difference in length between the sides 6 and bottom 5 is equal to the combined thickness of the ends. To permit the box being set up without danger of splitting the material from which it is formed, I round the corners of the ends 7, as indicated by the numeral 9. Supporting projections 10 are formed upon the ends 7 by stamping them from the bottom 5, as clearly shown in Fig. 1. If desired, the side walls and bottom of the box may be provided with ventilating openings 11, which may be of any desired shape. When the box is set up ready for use, the corresponding end flaps 8 overlap each other and are disposed upon the exterior of the ends 7, in which position they are retained by suitable fasteners 12. Referring to Fig. 2, it will be seen that the ends 7 project above the sides 6 of the box, and that the supporting projections 10 extend downwardly in the same plane as the former. When the boxes are stacked the bottom of one rests upon the end pieces 7 of the next lower box and the extensions 10 are sprung outwardly so as to engage the exterior faces of said end pieces and rest upon the end flaps 8, as clearly shown in the drawing. This construction spaces the boxes from one another and this is an important feature of my invention because it permits the boxes being filled to overflowing without the berries being crushed. When the crates of berries are shipped it is desirous to have the berry boxes appear well filled when they reach their destination, and therefore it is necessary that they be filled to overflowing at the point of shipment because it is well known that a settlement will take place during the passage.

The peculiar construction of my box and the ventilating openings 11 insure a free circulation of air both around the box and through the contents thereof and this is an important consideration because it insures the fruit against rapid decay. In boxes of this type, the ends 7 tend to warp considerably when moistened by contact with the fruit, and to prevent this, I provide the inwardly extending projections 13, which are stamped from the sides 6 adjacent the vertical edges thereof. These projections remain attached to the sides at their inner ends and when pressed inwardly a slight distance, will engage at their outer ends the end walls 7. These projections coöperate with the fasteners 12 and effectually prevent the end walls from warping.

From the foregoing description taken in connection with the accompanying drawing, it will be seen that I have provided a berry box which can be formed from a single sheet of material and which is admirably adapted for the purpose in view, namely, the transportation of berries in crates without danger of their being crushed and decaying prematurely. It is to be noted that the end flaps 8 not only serve to brace the ends 7 but also act as a support for the extensions 10 carried by the next highest box. These extensions retain the boxes in proper position when stacked in tiers and also provide ventilating openings in the bottom 5.

While I have shown and described the preferred embodiment of my invention, it is to be understood that minor changes may be made in the construction thereof, such as shall occur to me from time to time, without departing from the scope and spirit of the invention.

Having thus described my invention, what I claim is:—

A box formed of a single sheet of material, and comprising a bottom, side walls and end walls disposed in planes at right angles to the plane of the bottom, end flaps carried by the side walls and engaging the outer faces of the end walls, said end walls being extended above the upper edges of the side walls and end flaps, and depending projections stamped from the bottom and carried upon the lower edges of the end walls, said projections being adapted to rest upon the end flaps of a second box and engage the extended portions of the end walls of said second box.

In testimony whereof I affix my signature in presence of two witnesses.

CHARLES R. VAN OSDEL.

Witnesses:
W. W. BEARDSLEY,
C. H. MUSON.